(12) United States Patent
Healey et al.

(10) Patent No.: US 8,606,106 B2
(45) Date of Patent: Dec. 10, 2013

(54) OPTICAL FIBRE NETWORK

(75) Inventors: Peter Healey, Ipswich Suffolk (GB); David William Smith, Woodbridge Suffolk (GB)

(73) Assignee: Huawei Technologies Co., Ltd., Shenzhen (CN)

(*) Notice: Subject to any disclaimer, the term of this patent is extended or adjusted under 35 U.S.C. 154(b) by 581 days.

(21) Appl. No.: 12/742,427

(22) PCT Filed: Nov. 13, 2008

(86) PCT No.: PCT/GB2008/051060
§ 371 (c)(1),
(2), (4) Date: May 11, 2010

(87) PCT Pub. No.: WO2009/063242
PCT Pub. Date: May 22, 2009

(65) Prior Publication Data
US 2010/0266285 A1    Oct. 21, 2010

(30) Foreign Application Priority Data
Nov. 13, 2007  (GB) .................................. 0722204.5

(51) Int. Cl.
*H04J 14/00*    (2006.01)
*H04J 14/08*    (2006.01)

(52) U.S. Cl.
USPC ............................................ 398/66; 398/102

(58) Field of Classification Search
USPC ............................ 398/43, 66, 68, 79, 89, 102
See application file for complete search history.

(56) References Cited

U.S. PATENT DOCUMENTS

| | | | | |
|---|---|---|---|---|
| 5,010,543 A | * | 4/1991 | Hill ................................. | 398/75 |
| 5,559,624 A | * | 9/1996 | Darcie et al. .................... | 398/72 |
| 6,563,613 B1 | * | 5/2003 | Tochio ............................ | 398/25 |
| 7,272,316 B2 | * | 9/2007 | Jung et al. ....................... | 398/72 |

(Continued)

FOREIGN PATENT DOCUMENTS

| | | |
|---|---|---|
| EP | 0 615 358 A1 | 9/1994 |
| EP | 0615358 A1 * | 9/1994 |

OTHER PUBLICATIONS

Giuseppe Talli et al., "Feasiblility Demonstration of 100km Reach DWDM SuperPON with upstream BIt Rates of 205Gb/s" Photonic System Group, Physics Department university College cork, Cork, Ireland, Optical Society of America, 2005, 3 pges.*

(Continued)

*Primary Examiner* — Kenneth Vanderpuye
*Assistant Examiner* — Abbas H Alagheband
(74) *Attorney, Agent, or Firm* — Slater & Matsil, L.L.P.

(57) ABSTRACT

An optical fiber network comprises a laser source (1a) configured to generate laser light of a plurality of wavelengths. A first optical fiber (4a), transmits multi-wavelength light from the laser source to a location remote from the laser source. A wavelength division multiplexer (2) at the remote location (203) is connected to a plurality of second optical fibers (8). A plurality of optical modulators (9) are each connected optically to the wavelength division multiplexer (2) via a respective second optical fiber (8). The wavelength division multiplexer (2) is arranged to de-multiplex the multi-wavelength light received from the first optical fiber (4a) into a plurality of wavelengths and to supply a respective wavelength to each of the second optical fibers (8). The optical modulators (9) are reflective optical modulators each arranged to modulate light received from the associated second optical fiber (8) with a data signal and to reflect the modulated light back along the second optical fiber (8). The wavelength division multiplexer (2) is arranged to multiplex the modulated light from all of the second optical fibers (8) into a wavelength division multiplexed optical signal for onward transmission along a third optical fiber (13).

12 Claims, 2 Drawing Sheets

(56) References Cited

U.S. PATENT DOCUMENTS

2005/0123298 A1* 6/2005 Kim et al. .................. 398/70
2007/0133990 A1* 6/2007 Kim et al. .................. 398/72

OTHER PUBLICATIONS

Written Opnion of the International Searching Authority received in Patent Cooperation Treaty Application No. PCT/GB2008/051060, mailed Sep. 4, 2009, 9 pages.

Communication pursuant to Article 94(3) EPC received in European Application No. 08.849 232.7-2415, mailed Jan. 20, 2011, 7 pages.

Giuseppe Talli et al., "Feasibility Demonstration of 100km Reach DWDM SuperPON with Upstream Bit Rates of 2.5Gb/s and 10Gb/s," Photonic Systems Group, Physics Department, University College Cork, Cork, Ireland, Optical Society of America, 2005, 3 pages.

* cited by examiner

OPTICAL FIBRE NETWORK

FIELD OF THE INVENTION

The invention relates to an optical fiber network, and in particular to optical fiber sensor networks, telecommunications networks, computer networks and timing distribution/calibration networks.

BACKGROUND TO THE INVENTION

Wavelength division multiplexed passive optical network (WDM-PON) networks for long reach (100 km) telecommunications access networks have been considered by D. B. Payne and R. P. Davey et al. "The Future of Fibre Access Systems", BT Technol. J. 20.4, p. 104-114 (2002). WDM-PON networks can also be applied to sensor applications. However to collect data in real-time from many distributed sensors it is necessary to reduce uncertainty in event measurement. It is also desirable to minimise the electrical power consumption of the remote equipment.

There is increasing demand for high-speed readout of large capacity remote sensor systems for applications such as neutrino telescopes. These applications frequently require an optical communications system capable of collecting event data from a remote sensor array comprising many 1000's of detectors and transporting it back to a centralised data acquisition system. Event timing is critical in these applications, hence it is very important that the data collection systems preserves the event timing to a high precision. Currently, these systems tend to use a 'store-and-forward' approach where event information is time-stamped relative to a centralised master clock signal, recorded with the detector identity information, buffered, and then multiplexed with other event information for transmission to the data processing centre. A major difficulty with this approach is calibrating the clock distribution system to take account of the different propagation delays between the clock source and the detectors. This leads to a significant amount of remote electronics which must be powered, often in difficult environments (e.g. subsea).

This invention, at least in its preferred embodiments, describes an optical communications architecture that is capable of supporting both very large scale detector arrays and preserving timing information with minimal remote electronics.

SUMMARY OF THE INVENTION

Accordingly, this invention provides an optical fiber network comprising:
 a laser source configured to generate laser light of a plurality of wavelengths;
 at least one first optical fiber for transmitting multi-wavelength light from the laser source to a location remote from the laser source;
 a wavelength division multiplexer at the remote location and connected to a plurality of second optical fibers;
 a plurality of optical modulators each connected optically to the wavelength division multiplexer via a respective second optical fiber, wherein
 the wavelength division multiplexer is arranged to de-multiplex the multi-wavelength light received from the first optical fiber into a plurality of wavelengths and to supply a respective wavelength to each of the second optical fibers,
 the optical modulators are reflective optical modulators each arranged to modulate light received from the associated second optical fiber with a data signal and to reflect the modulated light back along the second optical fiber, the wavelength division multiplexer is arranged to multiplex the modulated light from all of the second optical fibers into a wavelength division multiplexed optical signal for onward transmission via a third optical fiber to a remote receiver,
 the remote receiver comprises a calibration arrangement configured to apply an optical signal to the end of the third optical fiber remote from the wavelength division multiplexer and to measure the propagation delay between at least one of the optical modulators and the remote receiver by determining the time taken for the optical signal to be reflected by the optical modulator.

Thus, according to the invention, the propagation delay between the optical modulators and the remote receiver can be determined accurately, even during operation of the network. In this way, the time of transmission of data signals received at the remote receiver can be determined from their time of receipt with very high accuracy. The first and third optical fibers may be housed in the same cable.

A first optical circulator may be provided between the first optical fiber and the wavelength division multiplexer. The third optical fiber may be connected to a port of the first optical circulator. An optical circulator configured in this way provides a means to allow the input to the wavelength division multiplexer to originate from the first optical fiber, but the WDM signal from the wavelength division multiplexer to be output to the third optical fiber.

A second optical circulator may be provided between the first optical circulator and the third optical fiber. An optical connection may be provided between a port of the second optical circulator and the input port of the first optical circulator connected to the first optical fiber. In this way a return path may be formed from the third optical fiber to the wavelength division multiplexer. With such a return path in place optical signals may be sent along the third optical fiber to the wavelength division multiplexer and on to the reflective optical modulator and returned along the third optical fiber. In this way, the propagation delay from the reflective optical modulator can be determined. Alternative configurations may be used to provide the return path.

As used above and in the claims, the term "optical circulator" is intended to encompass configurations of optical components that function correspondingly to an optical circulator. For example, the first or second optical circulator may be replaced by an optical splitter configured appropriately, although in this case, there would be greater losses.

A gated optical amplifier may be provided between the second optical circulator and the first optical circulator for selectively enabling the optical path from the third optical fiber to the wavelength division multiplexer. The gating in this section of the optical path may be provided by a non-amplifying gate, if desired. However, a gated amplifier is preferred in order to correspond to an amplifier provided in the downstream optical path. Thus, an optical amplifier may be provided between the first optical circulator and the second optical circulator for amplifying optical signals from the wavelength division multiplexer to the third optical fiber.

The optical path length from the remote receiver to the wavelength division multiplexer may be matched to the optical path length from the wavelength division multiplexer to the remote receiver (or may differ therefrom by a predetermined amount). In this way, the time of flight of a signal from the remote end of the third optical fiber to the optical modulator is half the total time of flight for the complete round trip (once any predetermined difference has been allowed for).

The optical modulator may be an electro-absorption modulator, for example. It is not necessary, although convenient, for the reflector and the modulator to be provided in a single device.

The data signals may be representative of the output of a sensor, in particular a plurality of sensors, associated with each of the optical modulators. The output of the plurality of sensors may be time domain multiplexed to form the data signals. An output of the plurality of sensors may be encoded by reference to a clock signal and a framing signal to form the data signals.

The invention extends to an electro-optical device comprising an optical modulator and a time domain multiplexer for receiving output signals from plurality of sensors, wherein the device is adapted for operation in the above network.

The invention extends to an electro-optical device comprising a wavelength division multiplexer and inputs for a first optical fiber, a third optical fiber and a plurality of second optical fibers, wherein the device is adapted for operation in the above network.

The invention extends to an electro-optical device comprising a calibration arrangement and an input for a third optical fiber, wherein the device is adapted for operation in the above network.

Viewed from a broad aspect, the invention provides a timing calibration system for WDM-PONs employing separate go/return fibers based on echo ranging techniques over the return fibers from remote reflection-mode data modulators. The ranging technique may be based on pulse echo round-trip propagation delay measurements. The ranging technique may be based on coded sequence (e.g. pseudo random binary sequence) autocorrelation measurements.

The DWDM PON sensor network may employ a multi-stage wavelength multiplexing device based on cyclic Arrayed Waveguide Grating (AWG) filters or combinations of AWG filters and wavelength add-drop-multiplexers (ADMs). The DWDM PON sensor network may employ a super-continuum source for generating the DWDM. The DWDM PON sensor network may employ an embedded reflectometer for optical testing and fault finding purposes. The network may use all-optical time division multiplexing techniques.

The network may use a separate fiber to provide a continuous wave comb of wavelengths to a remote signal distribution point with the purpose of avoiding limitations from Rayleigh backscatter which would be incurred over a long fiber path if bidirectional working were used.

The remote modulator may be a reflective electro-absorption modulator or a reflective semiconductor amplifier.

Viewed from a further broad aspect, the invention provides an asynchronous real-time Time to Digital Converter (TDC) and data multiplexer employing a local clock and framing signal, for communicating real-time events over a calibrated delay optical communications system. The converter and multiplexer may use statistical multiplexing in order to reduce the maximum bit-rate required.

Viewed from a further broad aspect, the invention provides a synchronous real-time Time to Digital Converter (TDC) and data multiplexer employing a common reference clock and framing signal for communicating real-time events over a calibrated delay optical communications system. The converter and multiplexer may use statistical multiplexing in order to reduce the maximum bit-rate required.

The converter and multiplexer may record detector event start and stop times relative to the local framing signal. The converter and multiplexer may record detector event start and stop time to different degrees of precision. The converter and multiplexer may monitor an array of detectors. The converter and multiplexer may be integrated with a serialiser/TDM and modulator driver.

The laser source may comprise an array of lasers of different wavelength and a wavelength division multiplexer. Alternatively, the laser source may comprise a super-continuum laser. Other configurations of the laser source are also possible.

BRIEF DESCRIPTION OF THE DRAWINGS

An embodiment of the invention will now be described by way of example only and with reference to the accompanying drawings, in which.

DETAILED DESCRIPTION OF AN EMBODIMENT

The invention is based on a type of telecoms WDM-PON (wavelength division multiplexed passive optical network) employing a combination of space, wavelength and time-division multiplexing. The invention overcomes the problems of the prior art by using a novel reflective network architecture which includes a method for calibrating time delays.

Figure 1:
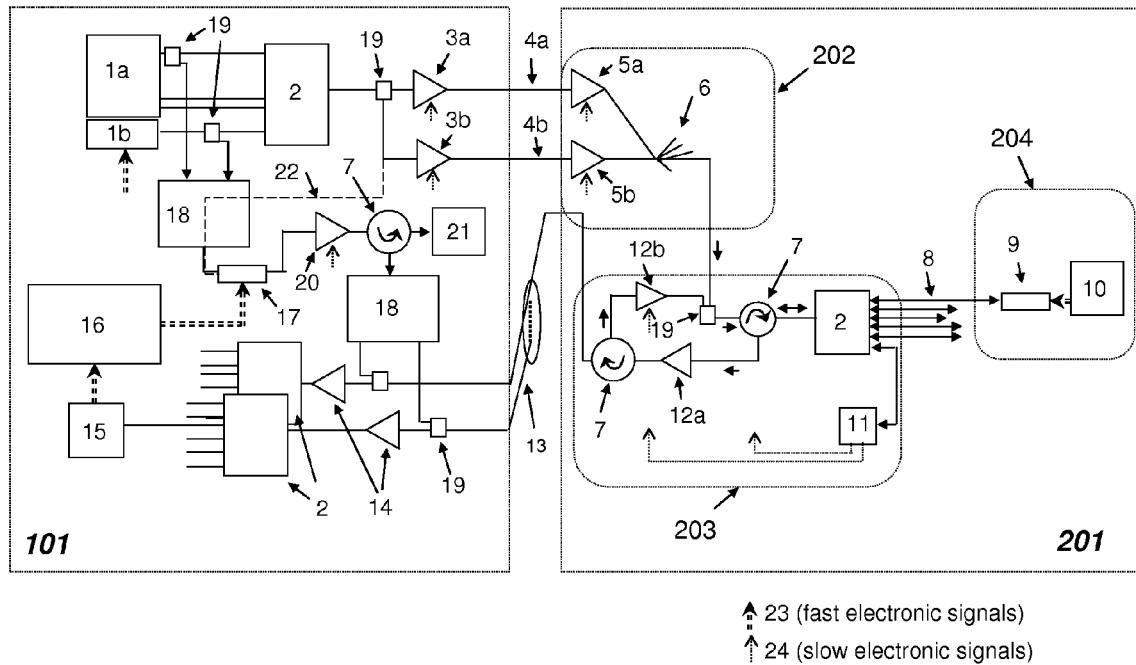
FIG. 1 is a schematic representation of a network architecture according to an embodiment of the invention.

Referring to FIG. 1, light from a centralised array (1a and 1b) of 'W' (~100) individual wavelength optical sources is combined by a multiplexer 2 into a dense WDM (DWDM) signal and amplified by an optical amplifier 3a for transmission over a fiber 4a (and possibly copied by an optical splitter 19 to a second amplifier 3b and fiber 4b for protection) to a remote sensor array 201. At the remote sensor array 201, the signal is amplified by optical amplifiers 5a or 5b and copied by an optical splitter network 6 to 'S' (~100) dense wavelength division multiplexers (DWDMs) 2 via an optical splitter 19 and an optical circulator 7. The DWDM 2 de-multiplexes the light and routes one wavelength to each group 204 of 'T' (~10 or more) detectors whose outputs are combined by a time-division multiplexor (TDM) 10. Thus, a total multiplex comprising W×S×T (~100,000 or more) detectors can be assembled. The connection between each DWDM 2 output port and its associated TDM detector group 204 is via a single bi-directional fiber 8 of up to ~2 km length. The TDM of 'T' detector signals is arranged to reflection modulate the light arriving from the centralised source by means of ultra-low-power reflective electro-absorption-modulators REAMs 9.

The returned signals are re-multiplexed in the DWDMs 2 to re-form a 100-wavelength DWDM which is routed by the circulator 7 to an optical amplifier 12a where it is amplified and transmitted back to the data acquisition centre 101, via another circulator 7, over one of S dedicated fiber links 13. This architecture avoids the problems caused by Rayleigh backscatter when the up and downstream signals share the same fiber. In this way, each TDM 10 has a unique space-wavelength address, hence reducing the electronic addressing requirement purely to the TDM.

There are many ways of forming a DWDM. Above we have described the use of an array of lasers whose outputs are combined and later separated in wavelength multiplexing devices 2. The DWDM could also be based on a single supercontinuum laser source. The DWDM multiplexer/de-multiplexer 2 could be formed in one stage using a single Arrayed Waveguide Grating (AWG) filter with W wavelength channel ports, or in a number of stages by combining a number of smaller AWGs (for example, cyclic wavelength router AWGs) with fewer wavelength channels. The DWDM could also be formed by a combination of wavelength add-drop-multiplexers (ADMs) and AWGs.

The optical S×W channels are independent and bandwidth transparent, so the capacity they carry can be tailored to suit the individual application (e.g., for the TDM or any other sensor communications needs, such as supervisory signals).

The fiber propagation delay is measured from the central location using an optical 'pulse echo' (or pseudo-random binary sequence) technique. Since all optical and time multiplexing delays are deterministic (and may be tracked) the whole system can work asynchronously which avoids the need for a master clock at the sensor location. One or more wavelengths in the DWDM 1b may be used for loop-timing purposes and for communications with a remote sensor receiver 11.

Figure 2:
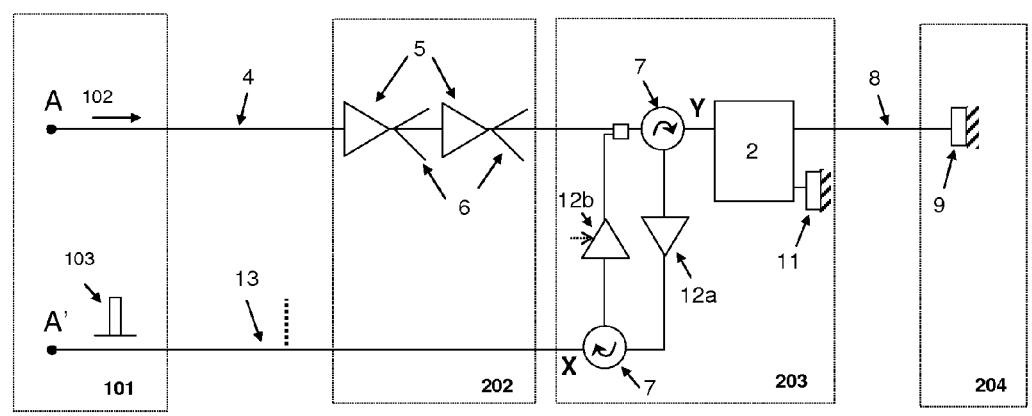
FIG. 2 is a schematic representation of details of the timing calibration element of the network of FIG. 1.

FIG. 2 summarises the delay calibration arrangement. The optical path between points X and Y in unit 203 is either matched in terms of delay ($T_{X-Y}=T_{Y-X}$), or pre-measured before installation, so that the return delay from each REAM ($T_{REAM-A'}$) can be accurately determined. Each DWDM could be measured in turn during the commissioning phase, and at later dates if deemed necessary. These measurements could be performed on each REAM 9 in turn or on all REAMs at the same time. The latter option could speed up the calibration procedure since most measurements would only need to be relative delay. The forward path amplifier 12b between X and Y is only active during the loop calibration procedure in order to avoid amplification of Rayleigh backscatter during normal data transmission back to the data acquisition centre 101. The following equations summarise the above timing calculations:

$T_{X-Y}=T_{Y-X}$ For illustration (or measured during construction)

$T_{A'-REAM-A'}$=Pulse echo delay from A' to a selected REAM
$T_{REAM-A'}=(T_{A'-REAM-A'})/2$ The round trip propagation delay between ports A and A' (corresponding to signal input and output ports at 1b and 15 respectively) is measured and continuously monitored during operation. This allows the forward propagation delay to be calculated since:

$$T_{A-REAM-A'}=T_{A-REAM}+T_{REAM-A'}$$

Thus, as the forward fibers 4a and 4b, and return fibers 13 are in the same cable, temperature effects can be tracked simply by monitoring the round trip delay.

The objective is to keep the real-time multiplexing electronics as simple and low power as possible. To this end, the maximum speed is set to ~10 Gbps since this is compatible with a range of commercial high-speed transmission chipsets such as serialisers, and de-serialisers (SERDES). The differential output voltage from these chips can also interface directly with the ultra-low-power REAM developed by the present applicant or simple drivers can be used to match the electronics to the modulators.

Figure 3:
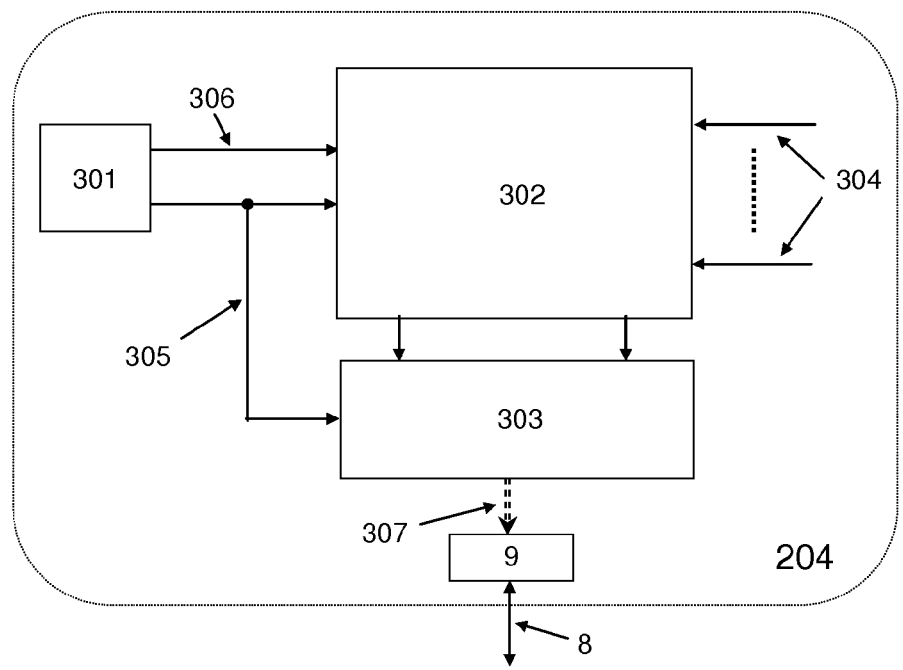
FIG. 3 is a block diagram of a sensor event encoder and multiplexer according to an embodiment of the invention.

At 10 Gbps the maximum number of ~1 ns resolution photomultiplier tube (PMT) signals that could be serialised with simple time-division-multiplexing would be 9 (one bit being required for framing). However, the typical detector signal properties (maximum event rates <300 kpps, and typical event durations >2 ns) allow this to be improved upon. Indeed, as shown in FIG. 3, using a simple clock 301 to generate a clock signal 306 and a framing signal 305 in the TDM 10, the event (start and end time) can be time-stamped relative to this framing signal using a multi-channel Time to Digital Converter (TDC) 302. The encoded events, along with the detector identity, is then serialized 303 for transmission to the data acquisition station 101.

Figure 4:
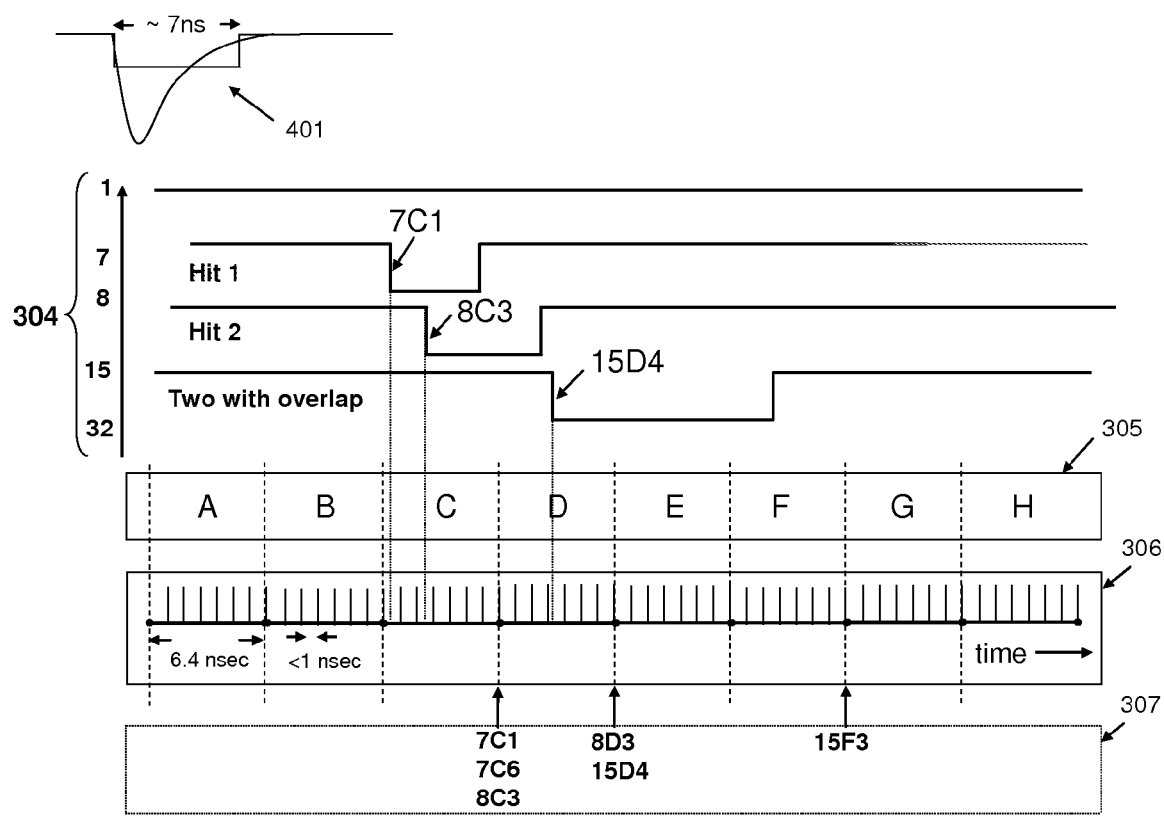
FIG. 4 is a timing diagram for the event encoder and multiplexer.

For example, if the frame period τ=6.4 ns (155 Mbps), the required resolution of the TDC is ~$Log_2(τ/0.5)$=4 bit resolution. A 32 detector TDM would require a further 5 bits for detector identification and 1 additional bit for the framing signal. The framing signal could be a simple clock pulse running at the frame rate or one bit of a pseudo-random binary sequence also running at the frame rate. The pseudo-random binary sequence has the advantage of giving a unique identity 305 to each frame with minimal overhead, as shown in FIG. 4. Thus, each TDM input event 304 is encoded in 10 bits. In this 32 detector example, the maximum number of simultaneous events per frame=7 for 10 Gbps "real-time" measurements (i.e., 7×9+1=64 bits in each 6.4 ns frame). The probability of a detector event in the frame time <0.002 (at the worst case dark count rate of 300 kpps).

FIG. 3 shows the real-time electronics block diagram. The serialiser 303 could be based on a commercial chipset such as the Broadcom BCM8124 16:1 mux (450 mW) and the multi-channel TDC 302 could be based on a custom ASIC (<1W).

It should be noted that although the design has been based on a 10 Gbps transmission link for each REAM the actual capacity required may be much less than this in practice. The actual capacity required will depend on the event probability and the degree of statistical multiplexing that can be employed in assembling the time-division multiplex. For example, if the frame duration in the previous example is increased by a factor of 16 to ~103 ns and the maximum number of events per frame=14, then the bit-rate can be reduced to ~3.5 Gbps. In this example, with a maximum detector event rate=300 kpps, then the probability of more than 14 events in the frame time is less than $10^{-9}$—assuming Poisson statistics.

FIG. 1 also shows an additional circulator 7 and reflectometer receiver 21 which may be used for fault-location over the optical paths between the data acquisition centre 101 and the remote sensor system 201. This uses selected wavelengths from the DWDM source 1a, 1b, and the optical modulator 17 and amplifier 20 to generate the test signal used by the reflectometer. Switches 18 are used to perform the wavelength and return fiber selection functions.

In summary, an optical fiber network comprises a laser source 1a configured to generate laser light of a plurality of wavelengths. A first optical fiber 4a, transmits multi-wavelength light from the laser source to a location remote from the laser source. A wavelength division multiplexer 2 at the remote location 203 is connected to a plurality of second optical fibers 8. A plurality of optical modulators 9 are each connected optically to the wavelength division multiplexer 2 via a respective second optical fiber 8. The wavelength division multiplexer 2 is arranged to de-multiplex the multi-wavelength light received from the first optical fiber 4a into a plurality of wavelengths and to supply a respective wavelength to each of the second optical fibers 8. The optical modulators 9 are reflective optical modulators each arranged to modulate light received from the associated second optical fiber 8 with a data signal and to reflect the modulated light back along the second optical fiber 8. The wavelength division multiplexer 2 is arranged to multiplex the modulated light from all of the second optical fibers 8 into a wavelength division multiplexed optical signal for onward transmission along a third optical fiber 13.

The advantages of the disclosed architecture for real-time sensor array applications include the following:

The network can employ current telecommunications technology;

No remote light sources are necessary, instead a centralized array of lasers can be shared by all detectors. Ultra-low-power reflective electro-absorption modulators (REAMs) can be used to transfer electronic signals into the optical domain for transmission back to a data acquisition centre. In this way the electro-optic design for each REAM and time domain multiplexer (TDM) is identical and they can be fitted in any position, because their space-wavelength address is only set once they have been connected to the system;

A single fiber connection on the output ports of the wavelength division multiplexer simplifies the detector interface requirements;

Remote timing calibration can be performed by pulse or pseudo-random binary sequence 'echo' measurement techniques over the return fibers. Subsequently, one wavelength can be used for continuous round-trip time-delay measurements in order to track and compensate for temperature induced delay variations.

The system can employ an embedded low-speed control system (e.g., for setting detector voltages/threshold control) whose signals can be conveyed either optically, or electronically over the power feed cables;

The design supports a staged deployment and future upgrades as new technology comes available.

The invention claimed is:

1. An optical fiber network comprising:
a laser source configured to generate laser light of a plurality of wavelengths;
at least one first optical fiber for transmitting multi-wavelength light from the laser source to a location remote from the laser source;
a wavelength division multiplexer at the remote location and connected to a plurality of second optical fibers;
a plurality of optical modulators each connected optically to the wavelength division multiplexer via a respective second optical fiber, wherein
the wavelength division multiplexer is arranged to de-multiplex the multi-wavelength light received from the first optical fiber into a plurality of wavelengths and to supply a respective wavelength to each of the second optical fibers,
the optical modulators are reflective optical modulators each arranged to modulate light received from the associated second optical fiber with a data signal and to reflect the modulated light back along the second optical fiber,
the wavelength division multiplexer is arranged to multiplex the modulated light from all of the second optical fibers into a wavelength division multiplexed optical signal for onward transmission via a third optical fiber to a remote receiver, and the remote receiver comprises a calibration arrangement configured to apply an optical signal to an end of the third optical fiber remote from the wavelength division multiplexer and to measure a propagation delay between at least one of the optical modulators and the remote receiver by determining a time taken for the optical signal to be reflected by the optical modulator.

2. An optical fiber network as claimed in claim 1, wherein a first optical circulator is provided between the first optical fiber and the wavelength division multiplexer and the third optical fiber is connected to a port of the first optical circulator.

3. An optical fiber network as claimed in claim 2, wherein a second optical circulator is provided between the first optical circulator and the third optical fiber and an optical connection is provided between a port of the second optical circulator and the input port of the first optical circulator connected to the first optical fiber whereby a return path is formed from the third optical fiber to the wavelength division multiplexer.

4. An optical fiber network as claimed in claim 3, wherein a gated optical amplifier is provided between the second optical circulator and the first optical circulator for selectively enabling the optical path from the third optical fiber to the wavelength division multiplexer.

5. An optical fiber network as claimed in claim 3, wherein an optical amplifier is provided between the first optical circulator and the second optical circulator for amplifying optical signals from the wavelength division multiplexer to the third optical fiber.

6. An optical fiber network as claimed in claim 1, wherein the optical path length from the remote receiver to the wavelength division multiplexer is matched to the optical path length from the wavelength division multiplexer to the remote receiver or differs therefrom by a predetermined amount.

7. An optical fiber network as claimed in claim 1, wherein the data signals are representative of the output of a plurality of sensors associated with each of the optical modulators.

8. An optical fiber network as claimed in claim 7, wherein the output of the plurality of sensors is time domain multiplexed to form the data signals.

9. An optical fiber network as claimed in claim 8, wherein an output of the plurality of sensors is encoded by reference to a clock signal and a framing signal to form the data signals.

10. An electro-optical device comprising an optical modulator and a time domain multiplexer for receiving output signals from a plurality of sensors, wherein the device is adapted for operation in the network of claim 1.

11. An electro-optical device comprising a wavelength division multiplexer and inputs for a first optical fiber, a third optical fiber and a plurality of second optical fibers, wherein the device is adapted for operation in the network of claim 1.

12. An electro-optical device comprising a calibration arrangement and an input for a third optical fiber, wherein the device is adapted for operation in the network of claim 1.

* * * * *